UNITED STATES PATENT OFFICE.

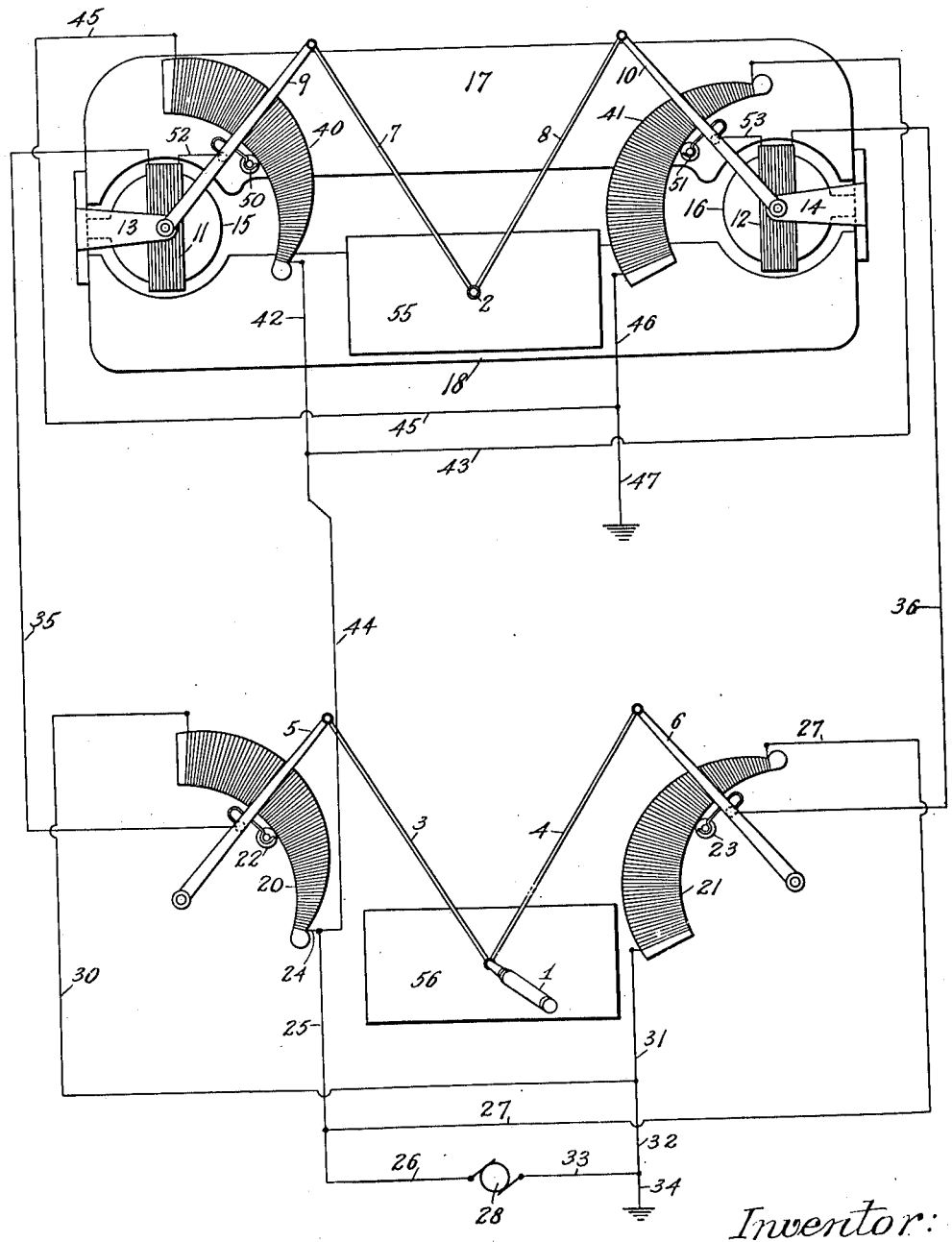

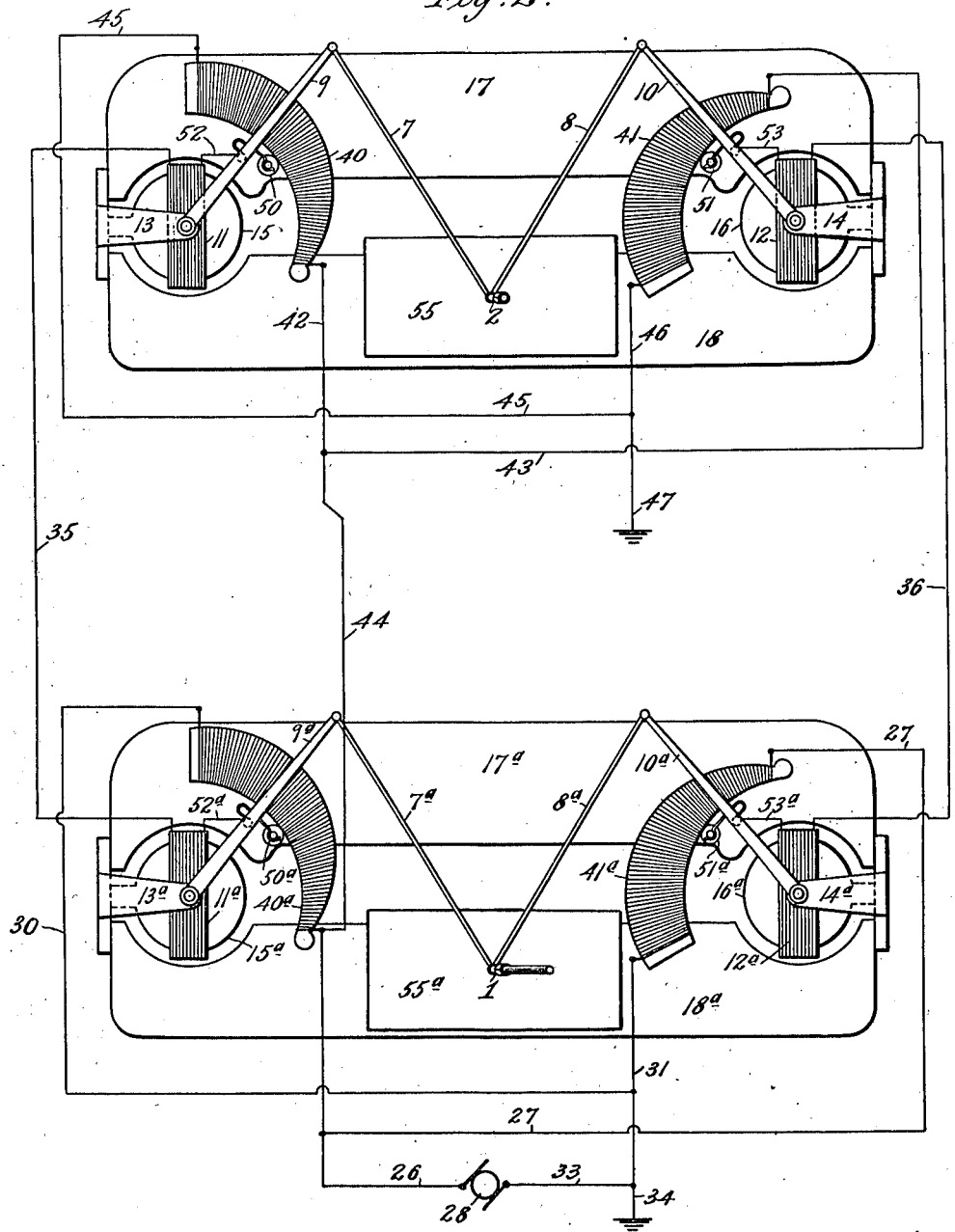

GEORGE S. TIFFANY, OF SUMMIT, NEW JERSEY, ASSIGNOR TO TELAUTOGRAPH CORPORATION, OF RICHMOND, VIRGINIA, A CORPORATION OF VIRGINIA.

TELAUTOGRAPHIC SYSTEM.

1,314,617. Specification of Letters Patent. Patented Sept. 2, 1919.

Application filed July 22, 1916, Serial No. 110,692. Renewed January 30, 1918. Serial No. 214,454.

*To all whom it may concern:*

Be it known that I, GEORGE S. TIFFANY, a citizen of the United States, residing at Summit, county of Union, and State of New Jersey, have invented certain new and useful Improvements in Telautographic Systems, fully described and represented in the following specification and the accompanying drawings, forming a part of the same.

This invention relates to improvements in telautographic systems of the variable-current-strength type, that is to say systems in which the currents traversing the two main line circuits from the transmitting station to the receiving station are derived from a dynamo or other suitable source of direct current located at the transmitter, are varied in strength according to the direction and extent of movement of the transmitting tracer, and, as thus varied, effect, with the aid of suitable electrical and other devices at the receiving station, movements of the receiving pen corresponding in direction and extent to those of the transmitting tracer, so that the receiving pen will reproduce the movements and writing of the transmitting tracer.

These movements of the receiving pen are effected, in systems now in use, directly by current-responsive members, termed pen-moving coils, which are included in the main line circuits and which, in so moving the receiving pen, move in a magnetic field excited from a local source of electrical energy connected with the latter by a suitable local circuit. In such systems these pen-moving coils are moved in one direction by the main line currents, as they increase in strength, and in the other direction, as the main line currents decrease in strength, by springs; the main line currents and springs, therefore, opposing each other.

Such systems, with the main line currents and springs opposing each other in the movement of the pen-moving coils, operate satisfactorily wherever, as is usually the case, the current supply source for the main lines is of constant voltage and the resistance conditions in the system are normal. Under such conditions the operator at the transmitter has perfect control over the movements of the receiving pen, which will, therefore, accurately reproduce the movements and writing of the transmitting tracer.

It sometimes happens, however, that the source of electrical energy used for the main line or the resistance conditions in the system, or both, are not normal but change or fluctuate. One likely cause of such change or fluctuation in resistance conditions, for example, is heating of the pen-moving coils, which increases their resistance to movement, with the result that the area or field of writing actually covered by the receiving pen is shifted and becomes very small.

Under such conditions, in systems where the main line currents and springs oppose each other in effecting the movements of the receiving pen, the receiving pen will not faithfully reproduce the movements and writing of the transmitting tracer but, on the contrary, distortions or other undesirable reproductions of the same, even to the point of illegibility.

It is the object of the present invention to provide a system which will be independent of these conditions so that, should they exist or occur from time to time in the system, the receiving pen will nevertheless faithfully reproduce the movements and writing of the transmitting tracer.

In the accompanying drawing,

Figure 1 illustrates diagrammatically a system suitable for this purpose; and

Fig. 2 a modification thereof.

In Fig. 1, 1 represents the transmitting tracer and 2 the receiving pen. The former is mounted, so as to move freely therein, in the converging ends of a pair of arms 3, 4, the opposite ends of which are pivoted in the outer ends of levers 5, 6. The other ends of the latter are in turn pivotally mounted in the frame of the transmitting apparatus. The receiving pen 2 is similarly connected with pen arms 7, 8, and levers 9, 10, the latter being fixed to a pair of current responsive members or pen-receiving coils 11, 12, pivotally mounted in brackets 13, 14, fixed to the receiver frame. These coils 11, 12, rock back and forth around the cores 15, 16, of a pair of bar magnets 17, 18, having pole pieces curved concentrically with the coils. These magnet bars, which provide the magnetic field for coils 11, 12, are assembled with the positive end of each opposite the negative end of the other.

The transmitting instrument is also equipped with a pair of rheostats 20, 21, against the windings of which bear a pair of contact rollers 22, 23, mounted on the tracer lever 5, 6, with which they are also electrically connected. As the tracer 1 is moved laterally, in writing, these tracer levers 5, 6, move with it and cause contacts 22, 23, to move endwise of rheostats, in one direction or the other depending upon the direction of movement of tracer 1, as is well understood. The smaller end of rheostat 20 is connected by wires 24, 25, 26, and the smaller end of rheostat 21, by wires 27, 26, with the positive terminal of a source of direct electrical current, as, for example, direct current dynamo 28. The other ends of the rheostats 20, 21, are connected by wires 30, 31, respectively, and wire 32, with the negative terminal of dynamo 28, which terminal is connected with earth by wires 33, 34.

Tracer lever 5 is connected by wire 35, with one terminal of pen-moving coil 11 at the receiver, while tracer lever 6 is connected by wire 36, with one terminal of pen-moving coil 12.

As thus far described, the construction is old and well known and needs but little further description. As the tracer 1 is moved laterally, in writing, the contacts 22, 23, will be moved along the rheostats 20, 21, and as they approach the smaller ends thereof the currents traversing the left and right main line circuit wires, 35, 36, respectively, from dynamo 28 to the receiver will be increased in strength, while as they approach the other ends they will be decreased in strength. As these currents are increased in strength coils 11, 12, will be rocked thereby in one direction, and in systems now in use, as before stated, their movement in this direction is opposed by springs, which move them in the opposite direction as the main line currents are decreased in strength. In this way the receiving pen is caused to reproduce the movements and writing of the transmitting tracer.

In the present system, however, these springs are omitted and other means substituted therefor, which will soon be described, for effecting such contrary movement of the coils.

In the present system the receiver is provided with a pair of rheostats 40, 41, corresponding to transmitter rheostats 20, 21. Like the latter, these are connected, at their smaller ends, by wires 42, 43, respectively, and 44, 25, and 26, with the positive terminal of dynamo 28. Their opposite ends are connected, by wires 45, 46, and wire 47, with earth, and thence, by earth and wires 34, 33, with the negative terminal of dynamo 28. The pen levers 9, 10, are also provided with roller contacts 50, 51, electrically connected with them and bearing against rheostats 40, 41, and these levers are also electrically connected by wires 52, 53, respectively, with the terminals of coils 11, 12, respectively, opposite those with which wires 35, 36, and tracer levers 5, 6, are connected.

Referring to the left hand side of the system it will be observed that the transmitter rheostat 20 and receiver rheostat 40 are connected in parallel with the positive terminal of dynamo 28; that the transmitter rheostat 20 is connected by its tracer lever 5, contact roller 22, and main line wire 35, with one terminal of the pen-moving coil 11; and that the receiver rheostat 40 is connected by its contact roller 50, pen lever 9, and wire 52, with the other winding of coil 11.

From this it results that when the transmitting apparatus and receiving apparatus are connected by the usual switch (not shown) both rheostats 20, 40, will be connected with the positive terminal of dynamo 28 from which currents will flow in opposite directions through coil 11. The circuit to coil 11 in such case, through rheostat 20, consists of wires 26, 25, 24, positive end of rheostat 20, contact roller 22, lever 5, wire 35, coil 11, wire 52, lever 9, contact roller 50, negative end of rheostat 40, wires 45, 47, to earth, thence by earth and wires 34, 33, to the negative terminal of dynamo 28. The current traversing this circuit will tend to rock coil 11 in one direction, as, for example, in a clockwise direction. The circuit through rheostat 40 consists of wire 26, wires 25, 44, 42 positive end of rheostat 40, contact roller 50, lever 9, wire 52, coil 11, wire 35, lever 5, contact roller 22, negative end of rheostat 20, and wires 30, 32, 33, to the negative terminal of dynamo 28. The current traversing this circuit will tend to rock coil 11 in the opposite direction to that just indicated, as, for example, in a counter-clockwise direction.

It will be obvious that the two currents traversing these two circuits will oppose each other, as to movement of coil 11; that when the electromotive force of one balances that of the other there will be no movement of coil 11 which, will then assume a position of rest, with levers 5, 9, occupying like positions lengthwise of their respective rheostats 20, 40, and that when this balance is disturbed the current traversing one circuit will dominate that of the other and thereby rock the coil 11 in a clockwise or counter-clockwise direction, as the case may be, until a balance in electromotive force is again established in the currents traversing the two circuits, when contact 50 and lever 9 will be again brought into a position lengthwise of rheostat 40 corresponding to that occupied by contact 22 and lever 5 with relation to rheostat 20. For the purpose of damping the motions of coil 11 to avoid undesirable oscillation thereof particularly as the currents balance, said coil is wound upon copper or aluminum shells.

All of these variations in current conditions are controlled by the transmitter operator through rheostat 20 in the following manner.

Assuming the levers 5 and 9 and the other parts of the system to be in the positions shown in the drawing, as the operator moves tracer 1 downwardly, roller contact 22 will be moved nearer the positive end of rheostat 20. This will increase the strength of the current traversing main line 35 over that traversing main line 44 in the opposite direction, and will therefore result in a rocking movement, in a clockwise direction, of coil 11, which will move lever 9 and contact 50 toward the positive end of rheostat 40, thereby moving receiving pen 2 downwardly across its writing platen 55. This movement of coil 11 will continue until the electromotive forces of the two currents traversing the main lines 35, 44, balance each other; the strength of the current traversing line wire 44 gradually increasing as contact 50 moves toward the positive end of rheostat 40. When the two currents finally balance each other in strength the contact 50 will assume the same position lengthwise of its rheostat 40 as that to which contact 22 has been moved lengthwise of its rheostat 20, and receiving pen 2 will assume the same position crosswise of its platen 55 as that to which tracer 1 has been moved crosswise of its platen 56.

If now it be assumed that tracer 1 is moved upwardly, thereby moving contact 22 toward the negative end of rheostat 20, the strength of the current traversing main line 35 will be decreased, with the result that the current (then greater in strength) traversing main line 44 through coil 11 will dominate it and rock the coil 11 in a counter-clockwise direction. It will continue doing so until lever 9 and contact 50 (which are then being moved toward the negative end of rheostat 40 by coil 11) and pen 2 assume positions in the receiver agreeing with those to which lever 5, contact 22 and tracer 1 have been moved by the operator at the transmitter, when the electromotive forces of the two circuits will again balance; and so on, the lateral movements of tracer 1 resulting in a succession of unbalancing and balancing effects on the oppositely moving line currents through coil 11, so that said coil will be moved in a clockwise or counter-clockwise direction and to an extent determined by the direction and extent of movement of the transmitting tracer which controls and determines these unbalancing effects.

The successful operation of such a system as this is independent of fluctuations or changes in the electro-motive force of the dynamo, or other source of electrical energy used, or in the resistance conditions between the transmitter and receiver, for the reason that the position of coil 11 is dependent simply upon the relation as to strength, between the currents passing through it, which is determined by the position of contacts 22, 50, lengthwise of their rheostats 20, 40.

The foregoing description of operation, although stated, for convenience, with specific reference to the left hand side of the system is equally applicable to the right hand side.

The modified system illustrated diagrammatically in Fig. 2 differs from that of Fig. 1 mainly in that the transmitting and receiving instruments are duplicates. The advantage of this arrangement is that each instrument may be used as a transmitter or a receiver. This reduces the equipment of a system from four instruments, namely a transmitter and a receiver at each end, to two instruments, and correspondingly reduces the initial and also maintenance cost of the system. In Fig. 2 the parts corresponding to those of the receiving instrument of Fig. 1 bear the same reference numerals except that those in the instrument which take the place of the transmitter of Fig. 1, each of these numerals is, for convenience of reference, followed by the reference letter "a". In Fig. 2 also each pair of arms 7, 8, and 7$^a$, 8$^a$, respectively, are so constructed at their converging ends as to provide a socket or other holding means for the temporary attachment of a tracer, as 1, or a receiving pen, as 2, according as the instrument is to be used for transmitting or receiving. Hereinafter these pen-arms and connections, whether used as a support for a tracer or a receiving pen, are referred to broadly as pen supports.

No detailed description of this system is necessary in view of the description which has been given of the system shown in Fig. 1 and in view of the following description of the operation of the system of Fig. 2.

Assuming that the instrument at the lower end of Fig. 1 is used for transmitting the movements of the tracer 1 will, as in the case of the system shown in Fig. 1, vary the strength of the currents traversing main lines 35, 36, and passing in one direction through the coils 11, 12, at the other instrument, and currents will also traverse line wires 44, 42, 43, in the opposite direction through said coils. These coils will, as before, be rocked back or forth, according as one of these currents is increased in strength over that acting in opposition to it. During these movements of tracer 1 coils 11$^a$, 12$^a$, connected therewith through arms 7$^a$, 9$^a$, and 8$^a$, 10$^a$, will rock idly back and forth but produce no effect on the line currents, although, as shown, they are connected with line wires 35, 36, and by wires 52ª and 53ª, with levers 9ª and 10ª, and thus form part of the two main line circuits to the distant instrument then acting as a receiver.

If now the working conditions of the two instruments be reversed, and the upper instrument be used for transmitting to the lower one for receiving, the operation of coils 11ª, 12ª, will be identical with that, just described, of coils 11, 12, and during such operation the latter will be rocked idly back and forth as the arms and lever 7, 9, and 8, 10, are moved by the tracer substituted for pen 2. Of course in such reversed condition of the instruments a pen would be substituted for tracer 1 in the lower instrument, Fig. 1.

What is claimed is:

1. In a variable-current-strength telautographic system, the combination of a pair of current responsive members each movable alternately in opposite directions, a source of electric energy, a pair of circuits therefrom for each current responsive member over which currents of like polarity are passed through said member to move it in opposite directions as one current exceeds the other in strength, means, in one of said circuits, controlled by the transmitting tracer, for varying the strength of the current traversing that circuit, and means, in the other of said circuits, controlled by the current responsive member, for correspondingly varying the strength of the current traversing that circuit until the two currents balance, substantially as described.

2. In a variable-current-strength telautographic system, the combination of a pair of current responsive members each movable alternately in opposite directions, a source of electric energy, a pair of circuits therefrom for each current responsive member over which currents of like polarity are passed through said member to move it in opposite directions as one current exceeds the other in strength, means, in one of said circuits, including a rheostat and a movable contact coacting therewith and controlled in its movements by the transmitting tracer, for varying the strength of the current traversing that circuit, and means, in the other of said circuits, controlled by the current responsive member, for correspondingly varying the strength of the current traversing that circuit until the two currents balance.

3. In a variable-current-strength telautographic system, the combination of a pair of current responsive members, each movable alternately in opposite directions, a source of electric energy, a pair of circuits therefrom for each current responsive member, over which currents of like polarity are passed through said member to move it in opposite directions as one current exceeds the other in strength, means, in one of said circuits, controlled by the transmitting tracer, for varying the strength of the current traversing that circuit, and means, in the other of said circuits, including a rheostat and a movable contact coacting therewith and controlled in its movements by the current responsive member, for correspondingly varying the strength of the current traversing that circuit until the two currents balance.

4. In a variable-current-strength telautographic system, the combination of a pair of current responsive members each movable alternately in opposite directions, a source of electric energy, a pair of circuits therefrom for each current responsive member, over which currents of like polarity are passed through said member to move it in opposite directions as one current exceeds the other in strength, means, in one of said circuits, including a rheostat and a movable contact coacting therewith and controlled in its movements by the transmitting tracer, for varying the strength of the current traversing that circuit, and means, in the other of said circuits, including a rheostat and a movable contact coacting therewith and controlled in its movements by the current responsive member, for correspondingly varying the strength of the current traversing that circuit until the two currents balance.

5. In a variable-current-strength telautographic system, the combination of a pair of pen-moving coils, each movable alternately in opposite directions, a magnetic field therefore, a source of electric energy, a pair of circuits therefrom for each coil over which currents of like polarity are passed through said coil to move it in opposite directions as one current exceeds the other in strength, means, in one of said circuits, controlled by the transmitting tracer, for varying the strength of the current traversing that circuit, and means, in the other of said circuits, controlled by the coil for correspondingly varying the strength of the currents traversing that circuit until the two currents balance.

6. In a variable-current-strength telautographic system, the combination of a pair of pen-moving coils, each movable alternately in opposite directions, a magnetic field therefor, a source of electric energy, a pair of circuits therefrom for each coil over which currents of like polarity are passed through said coil to move it in opposite directions as one current exceeds the other in strength, means, in one of said circuits, including a rheostat and a movable contact coacting therewith and controlled in its movements by the transmitting tracer, for varying the strength of the current traversing that circuit, and means, in the other of said circuits, controlled by the coil, for correspondingly varying the strength of the currents traversing that circuit until the two currents balance.

7. In a variable-current-strength telautographic system, the combination of a pair of pen-moving coils, each movable alternately in opposite directions, a magnetic field therefor, a source of electric energy, a pair of circuits therefrom for each coil over which currents of like polarity are passed through said coil to move it in opposite directions as one current exceeds the other in strength, means, in one of said circuits, controlled by the transmitting tracer, for varying the strength of the current traversing that circuit, and means, in the other of said circuits, including a rheostat and a movable contact coacting therewith and controlled in its movements by the coil, for correspondingly varying the strength of the currents traversing that circuit until the two currents balance.

8. In a variable-current-strength telautographic system, the combination of a pair of pen-moving coils, each movable alternately in opposite directions, a magnetic field therefor, a source of electric energy, a pair of circuits therefrom for each coil over which currents of like polarity are passed through said coil to move it in opposite directions as one current exceeds the other in strength, means, in one of said circuits, including a rheostat and a movable contact coacting therewith and controlled in its movements by the transmitting tracer, for varying the strength of the current traversing that circuit, and means, in the other of said circuits, including a rheostat and a movable contact coacting therewith and controlled in its movements by the coil, for correspondingly varying the strength of the currents traversing that circuit until the two currents balance.

9. In a variable-current-strength telautographic system, the combination of two instruments, a pair of current responsive members in each, a source of electric energy, a pair of circuits therefrom for each member and the corresponding member of the other instrument over which currents of like polarity are passed through said member to move it in opposite directions as one current exceeds the other in strength, a pen support in each instrument adapted to be moved manually to transmit and by the current responsive members thereof to receive, and current-varying means controlled by the pen-supports and by the current responsive members of the two instruments, whereby, as the pen-support of one is moved to transmit and the current responsive members of the other are moved to receive, said pen-support will vary the strength of the current traversing one circuit and said members will correspondingly vary the current traversing the other until the two balance.

10. In a variable-current-strength telautographic system, the combination of two instruments, a pair of current responsive members in each, a source of electric energy, a pair of circuits therefrom for each member and the corresponding member of the other instrument over which currents of like polarity are passed through said member to move it in opposite directions as one current exceeds the other in strength, a pen-support in each instrument adapted to be moved manually to transmit and by the current responsive members thereof to receive, and current-varying means comprising a rheostat for each current responsive member and a pair of contacts coacting with said rheostats and controlled in their movements by the pen-supports and by the current responsive members of the two instruments, whereby, as the pen-support of one is moved to transmit and the current responsive members of the other are moved to receive, said pen-support will vary the strength of the current traversing one circuit and said members will correspondingly vary the current traversing the other until the two balance.

11. In a variable-current-strength telautographic system, the combination of two instruments, a pair of coils and a magnetic field therefor in each, a source of electric energy, a pair of circuits therefrom for each coil and the corresponding coil of the other instrument over which currents of like polarity are passed through said first named coil to move it in opposite directions as one current exceeds the other in strength, a pen-support in each instrument adapted to be moved manually to transmit and by the coils thereof to receive, and current-varying means controlled in their movements by the pen-supports and by the coils of the two instruments, whereby, as the pen-support of one is moved to transmit and the coils of the other are moved to receive, said pen-support will vary the strength of the current traversing one circuit and said coils will correspondingly vary the strength traversing the other until the two balance.

12. In a variable-current-strength telautographic system, the combination of two instruments, a pair of coils and a magnetic field therefor in each, a source of electric energy, a pair of circuits therefrom for each coil and the corresponding coil of the other instrument over which currents of like polarity are passed through said first named coil to move it in opposite directions as one current exceeds the other in strength, a pen-support in each instrument adapted to be moved manually to transmit and by the coils thereof to receive, and current-varying means, comprising a rheostat for each coil and a pair of contacts coacting with said rheostats and controlled in their movements by the pen-supports and by the coils of the two instruments, whereby, as the pen-support of one is moved to transmit and the coils of the other are moved to receive, said pen-support will vary the strength of the current traversing one circuit and said coils will correspondingly vary the current traversing the other until the two balance.

13. In a telautograph, the combination of means operated by the movements of the transmitting tracer for varying the line currents, pen moving magnets operated by such variable line currents, and means operating in conjunction with the movements of the receiving pen for electrically balancing the effect of said variable line currents upon said pen moving magnets, substantially as described.

In testimony whereof, I have hereunto set my hand.

GEORGE S. TIFFANY.